United States Patent
Zychowicz et al.

(10) Patent No.: US 6,267,407 B1
(45) Date of Patent: Jul. 31, 2001

(54) RESTRAINT ASSEMBLY

(75) Inventors: Julie Ann Zychowicz, Dearborn Heights; Thomas F. Hrynik, Troy; Thomas Walter Howells, Canton; Gerald Martin Powell, Detroit, all of MI (US)

(73) Assignee: Ford Global Technolgies, Inc., Dearborn, MI (US)

( * ) Notice: Subject to any disclaimer, the term of this patent is extended or adjusted under 35 U.S.C. 154(b) by 0 days.

(21) Appl. No.: 09/408,031

(22) Filed: Sep. 29, 1999

(51) Int. Cl.[7] ................................................. B60R 21/16
(52) U.S. Cl. ................................ 280/728.2; 280/730.2; 280/743.1
(58) Field of Search ........................ 280/728.2, 730.1, 280/730.2, 743.1, 728.1, 732; 296/70, 208; 454/137

(56) References Cited

U.S. PATENT DOCUMENTS

| | | |
|---|---|---|
| 3,897,961 | 8/1975 | Leising et al. . |
| 5,335,936 | 8/1994 | Bocker et al. . |
| 5,335,937 | 8/1994 | Uphues et al. . |
| 5,362,097 | 11/1994 | Barske . |
| 5,425,550 * | 6/1995 | Paxton et al. ........................ 280/732 |
| 5,470,103 | 11/1995 | Vaillancourt et al. . |
| 5,531,471 | 7/1996 | Terai . |
| 5,671,943 * | 9/1997 | Barnhart ............................ 280/732 |
| 5,791,683 * | 8/1998 | Shibata et al. ................... 280/730.1 |
| 5,845,930 * | 12/1998 | Maly et al. ...................... 280/730.2 |
| 5,975,566 | 11/1999 | Bocker et al. . |
| 6,010,146 * | 1/2000 | Otsuka et al. ..................... 280/732 |
| 6,065,771 * | 5/2000 | Kawakubo et al. . |
| 6,126,191 * | 10/2000 | Pepperine et al. .................. 280/732 |

* cited by examiner

Primary Examiner—Daniel G. DePumpo
Assistant Examiner—Christopher Bottorff
(74) Attorney, Agent, or Firm—David B. Kelley

(57) ABSTRACT

A vehicle restraint assembly 10 having a selectively inflatable and expandable assembly 20 and a member 34 which is selectively and removably coupled to a vent member 30 and which overlays the assembly 20. The member 34 cooperates with the vent member 30 to direct and transport air within the vehicle passenger compartment 28. The selectively expanded assembly 20 causes member 34 to become selectively dislodged from member 30, thereby allowing assembly 20 to enter the vehicle passenger compartment 28 and to desirably protect the vehicle occupants.

15 Claims, 4 Drawing Sheets

RESTRAINT ASSEMBLY

FIELD OF THE INVENTION

This invention relates to a restraint assembly and more particularly, to a selectively expandable restraint assembly which may be deployed within a vehicle.

BACKGROUND OF THE INVENTION

Selectively expandable and/or inflatable restraint assemblies, commonly referred to as "air bags" or "curtains", are typically deployed within a vehicle and selectively and inflatably expand into the passenger compartment when the vehicle is struck by or collides with another vehicle or object, or "rolls over". These expanded assemblies substantially protect the vehicle occupants from injury by substantially preventing the occupants from impacting or "crashing into" the dashboard and/or various other portions of the vehicle. These expanded assemblies therefore reduce the probability that the vehicle occupants will be seriously injured in a vehicle collision. While these assemblies are effective in protecting the vehicle occupants, they must be carefully positioned and/or placed within the vehicle.

That is, these selectively inflatable assemblies must not be mounted or placed behind any other member or vehicle assembly which may undesirably interfere with and/or substantially prevent, obstruct, or "block" the desired and selective expansion of these inflating restraint assemblies, thereby preventing the restraint assemblies from desirably entering the passenger compartment and protecting the vehicle occupants.

Many vehicles employ a relatively complex array of structural support or "frame" members, air conditioning or vent type members, and various other mechanical and/or electronic and/or electromechanical assemblies. All of these members and assemblies require some mounting space. The available mounting space is constrained by the structure of the vehicle and by the desire and/or goal to create a comfortable occupant or passenger compartment. Hence, it is highly desirable to efficiently utilize all of the available mounting space in order to allow the passenger compartment to be relatively large.

As the use of expandable restraint assemblies, or airbags, has increased, especially the use of additional "side type air bags" or "curtains", increased amounts of mounting space has been required, thereby further restricting the space which is available in which to mount all of the necessary and desired members and assemblies.

There is therefore a need for a selectively expandable and/or inflatable vehicle restraint assembly which may be mounted and/or hidden behind a vehicle member in order to efficiently utilize the available mounting space, and which may selectively expand within the vehicle passenger compartment to protect the vehicle occupants.

SUMMARY OF THE INVENTION

It is a first object of the invention to provide a selectively expandable vehicle restraint assembly which overcomes at least some of the drawbacks of prior vehicle restraint assemblies.

It is a second object of the invention to provide a selectively expandable vehicle restraint assembly which overcomes at least some of the drawbacks of prior vehicle restraint assemblies and which is adapted to be mounted behind a vehicle member and which selectively and desirably expands into the vehicle passenger compartment in the event of a vehicle collision.

According to a first aspect of the present invention a vehicle restraint assembly is provided. The vehicle restraint assembly is adapted for use within a vehicle having a passenger compartment and a member. The vehicle restraint assembly includes a first portion which is removably placed within the member; and a second portion which is mounted in close proximity to the first portion and which is selectively movable from a first stored position to a second expanded position in which the second portion causes the first portion to be dislodged from the member, thereby allowing the second portion to expand into the passenger compartment of the vehicle.

According to a second aspect of the present invention a member is provided for use within a vehicle of the type having a selectively expandable restraint assembly which expands along a certain path. The member includes first and second end portions which are coupled to the vehicle and a central portion which is removably connected to the first and second end portions and which is positioned within said certain path.

According to a third aspect of the present invention a method is provided for mounting a selectively expandable restraint assembly within a vehicle of the type having a least one member. The method includes the steps of removing a portion of the at least one member; replacing the removed portion of the at least one member with a second member; and mounting the selectively expandable restraint assembly proximate to the second member.

These and other features, aspects, and advantages of the invention will become apparent from a reading of the following detailed description of the preferred embodiment, by reference to the subjoined claims, and by reference to the following drawings.

DETAILED DESCRIPTION OF THE PREFERRED EMBODIMENT OF THE INVENTION

Figure 1:
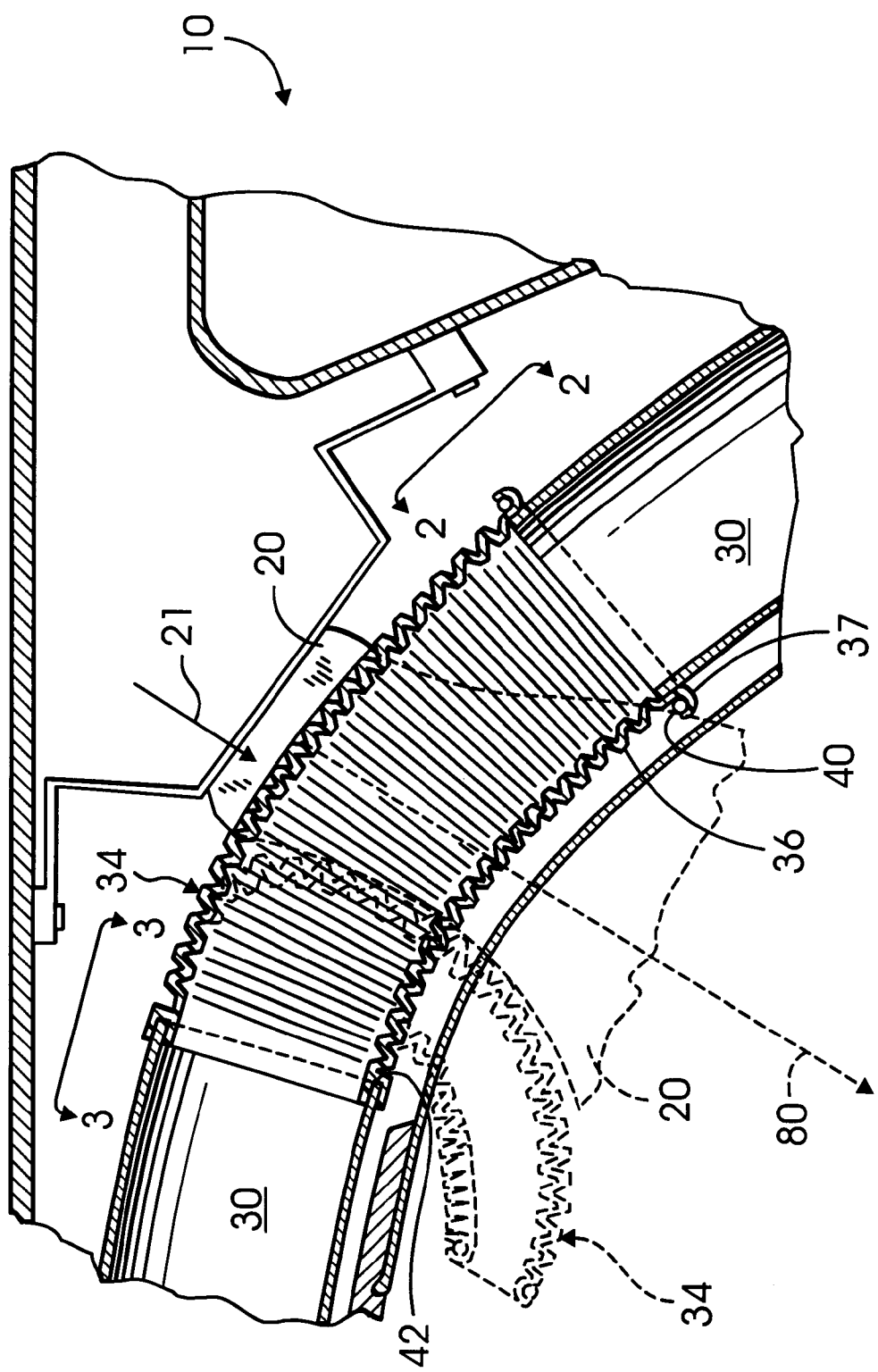
FIG. 1 is a fragmented side view of the selectively expandable restraint assembly which is made in accordance with the teachings of the preferred embodiment of the invention and which shows the movement of a portion of the selectively expandable restraint assembly from a first stored position to a second expanded occupant protection position.
Figure 3:
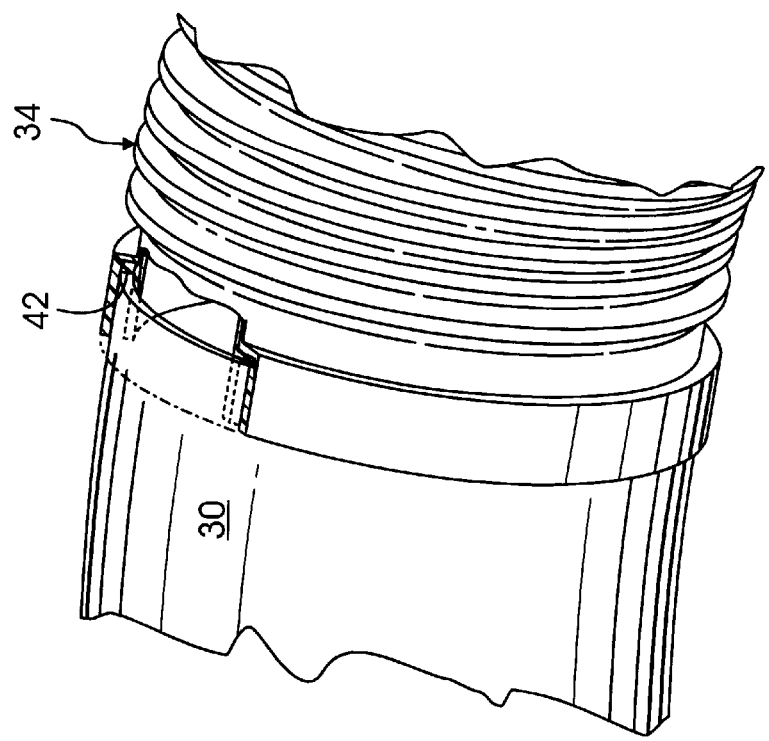
FIG. 3 is a partial view of the selectively expandable restraint assembly which is shown in FIG. 1 and which is taken along view line 3—3.
Figure 2:
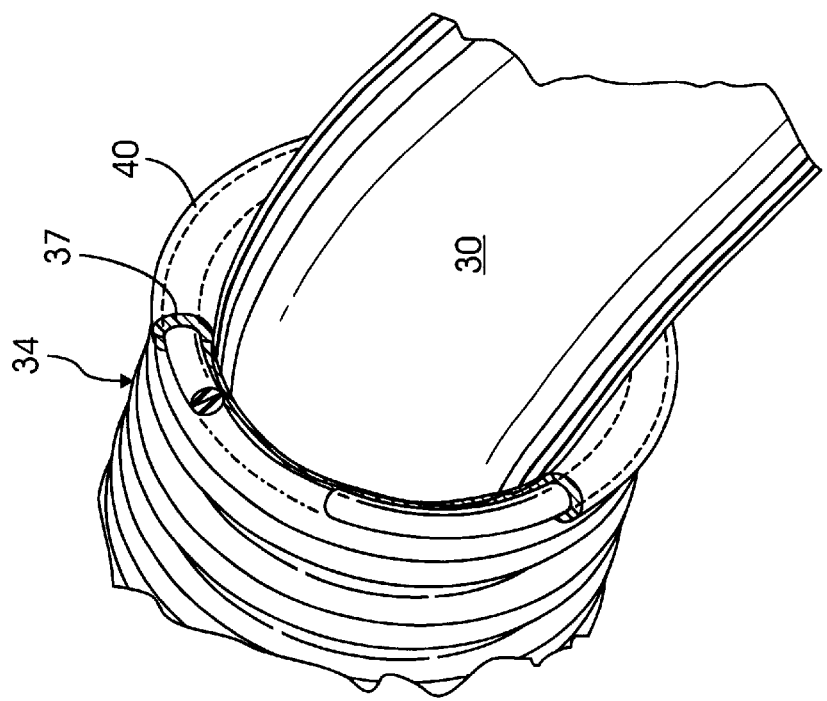
FIG. 2 is a partial view of the selectively expandable restraint assembly which is shown in FIG. 1 and which is taken along view line 2—2.
Figure 4:
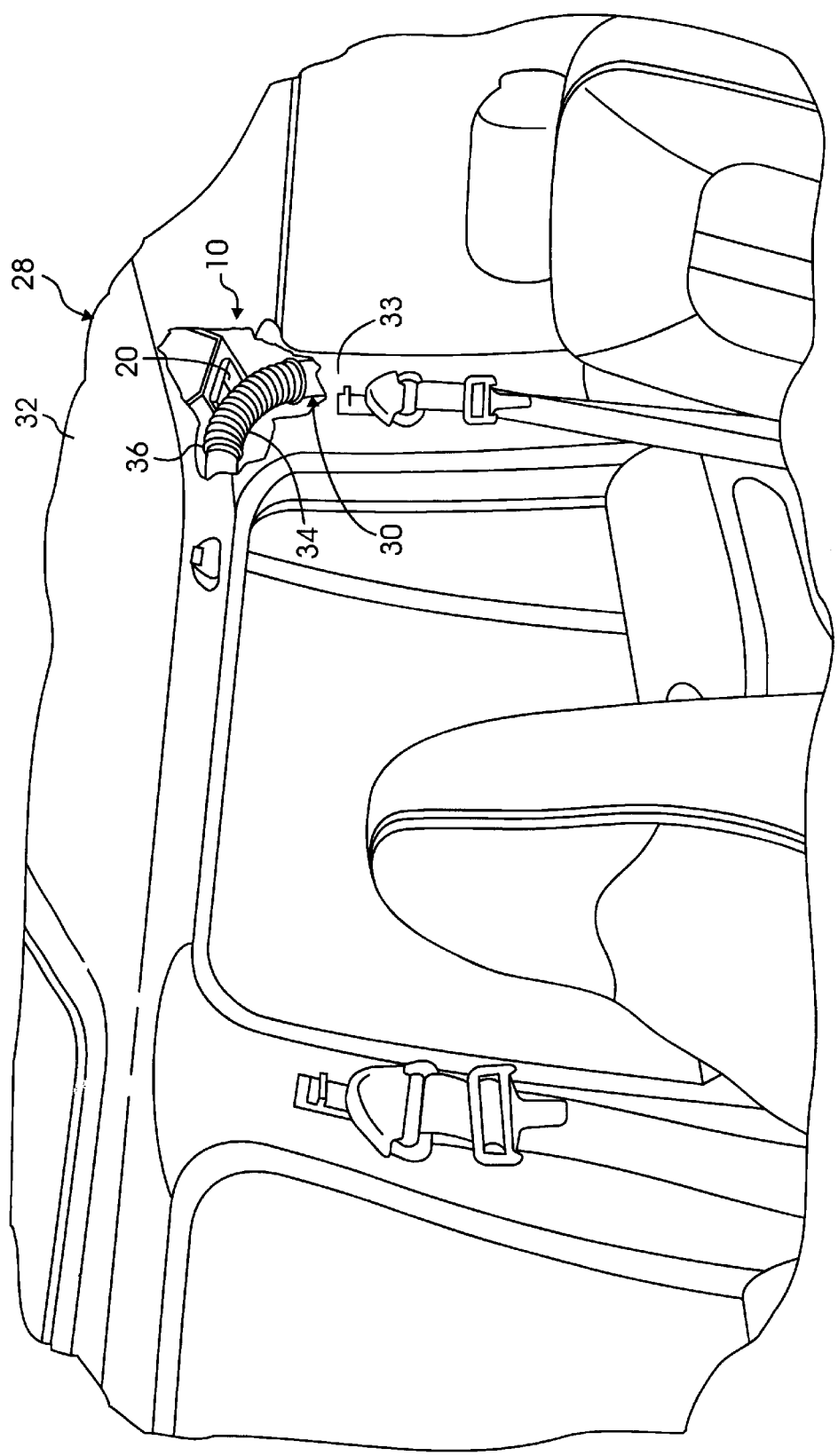
FIG. 4 is a fragmented side view of a vehicle passenger compartment employing the selectively expandable restraint assembly which is shown in FIG. 1.
Figure 5:
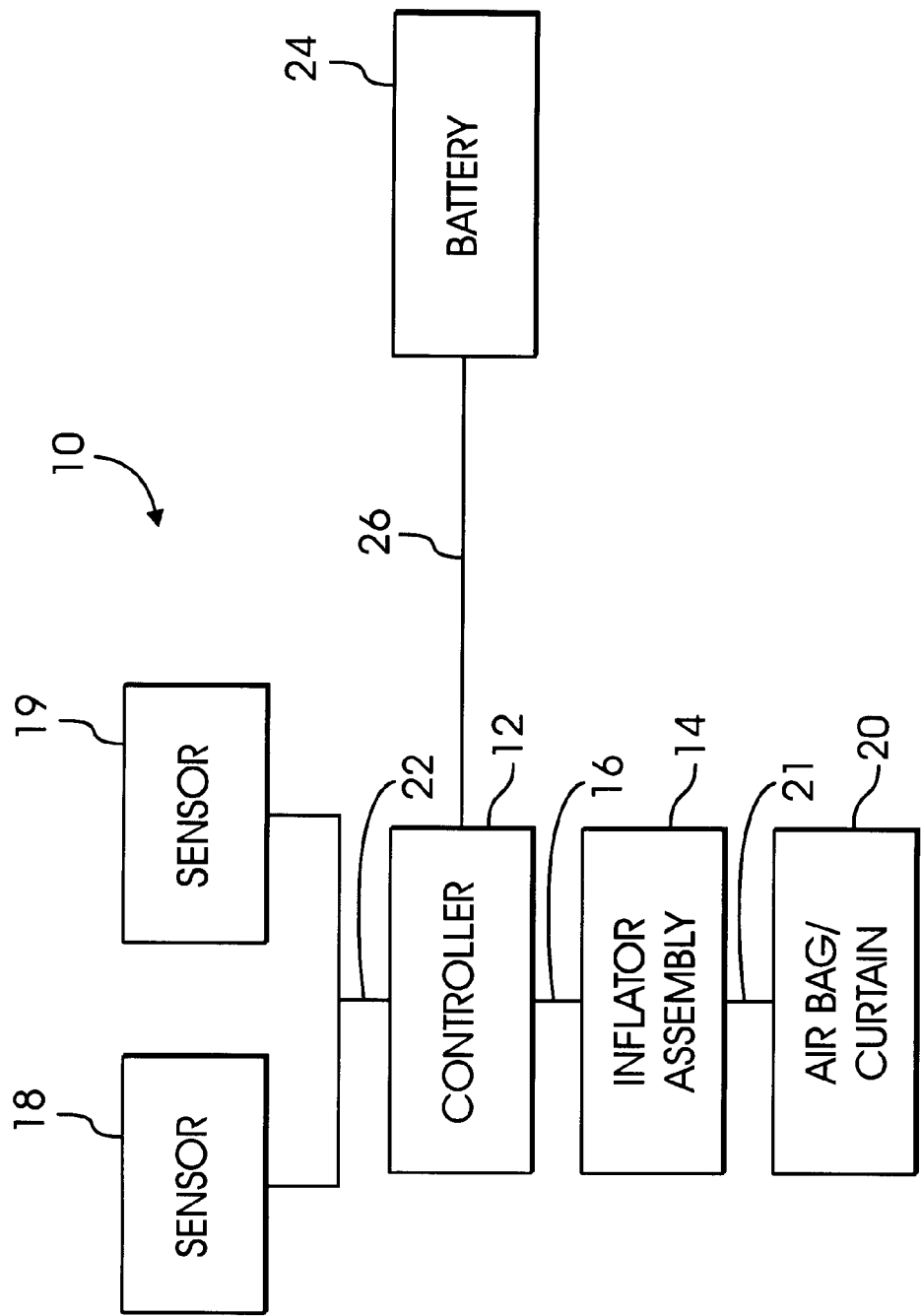
FIG. 5 is a block diagram of the selectively expandable restraint assembly which is shown in FIGS. 1–4.

Referring now to FIGS. 1–5, there is shown a selectively expandable/inflatable restraint assembly 10 which is made in accordance with the teachings of the preferred embodiment of the invention and which is adapted for use within a passenger compartment 28 of a conventional vehicle. As shown, assembly 10 includes a controller 12, operating under stored program control, which is physically, communicatively, and electrically coupled to a conventional inflator assembly 14, by use of bus 16, and to sensors 18, 19, by use of bus 22. Controller 12 is further physically and electrically coupled to vehicle battery 24 by bus 26 and receives electrical power from the battery 24. Inflator assembly 14 is physically and communicatively coupled to a selectively expandable/inflatable device or assembly 20, such as a conventional and commercially available "air bag" or "curtain", by bus 21.

Sensors 18, 19 are conventional sensors which are adapted to detect or sense the occurrence of a vehicle collision, impact, or some other predetermined event, such as a "rollover" condition, and to generate and transmit electronic signals indicating the occurrence of this sensed condition. These signals are selectively communicated to controller 12 by bus 22. Upon receipt of these signals, controller 12 selectively activates assembly 14, thereby causing the "air-bag"/"curtain" 20 to selectively and desirably expand into the passenger compartment 28.

As best shown in FIGS. 1–4, in order to efficiently utilize the existing and/or available mounting space, according to the teachings of the preferred embodiment of the invention, assembly 20 is adapted to be selectively mounted or placed behind a conventional vehicle member 30 and thereby "hidden" from view (e.g., member 30 overlays or obstructs assembly 20). In one non-limiting embodiment of the invention, member 30 has a generally circular cross sectional area, is substantially tubular in shape is substantially hollow, and corresponds to and/or comprises a conventional air conditioning duct or passage which is formed within and/or which is selectively placed within a typical and commercially available vehicle and which is typically coupled to the vehicle's air conditioning assembly (not shown) and to at least one vent which is formed and/or contained within the vehicle (not shown). Member 30 therefore carries and/or transports air to the various portions of a vehicle and to various portions of the passenger compartment 28. In one non-limiting embodiment, member 30 is placed and/or operatively mounted within the vehicle headliner 32. Both member 30 and assembly 20 may be "covered" by or hidden within a conventional and removable trim member 33. It should be realized that member 30 may correspond to and/or comprise other conventional vehicle members or assemblies and that this invention is not to be limited to the use of an air conditioning or air passage member 30.

In the preferred embodiment of the invention, a portion of member 30 is selectively removed and replaced with a "break away" member 34. In the most preferred embodiment of the invention, member 34 is substantially hollow, is adapted to frictionally receive member 30, and is formed from and/or manufactured from a different material than that which is used to form and/or manufacture member 24. In one non-limiting embodiment, member 34 may be formed from commercially available rubber or virtually any other material which will not easily fragment, or "break" even when subject to relatively large forces and/or even when forcibly engaged by another member or assembly. Moreover, member 34 may include several pleated portions or corrugations 36, thereby allowing the member 34 to selectively expand without becoming displaced and/or dislodged and/or disengaged from member 30.

Particularly, in one non-limiting embodiment, "break away" member 34 has a first end portion which frictionally receives a first end of the member 30 and which includes an integrally formed groove or lip portion 37 which selectively receives a resilient ring member 40 and which allows the received ring member 40 to compressibly secure the first end of member 30 to the first end of member 34. In one non-limiting embodiment, member 40 is manufactured from a rubber material, is substantially "C"-shaped, and removably and compressibly resides within groove 37 while compressibly coupling the communicating first end portions of members 30, 34. Member 34 has a second end portion having a second groove 42 which is substantially "U"-shaped, which circumferentially extends around the second end of member 34, and which frictionally receives member 30 and secures the second end of member 34 to the second end of member 30. In this manner, member 34 is removably secured to member 30.

In operation, member 34 is communicatively secured to member 30 and cooperates with member 30 to selectively direct and transport air to various portions of the vehicle and passenger compartment 28, thereby allowing member 30 to perform and/or achieve its desired and "normal" air distribution/direction function.

Upon transmission of a signal from sensors 18 and/or 19, indicating the occurrence for collision or other event, controller 12 causes member 20 to selectively inflate and/or expand along an expansion path 80. In one non-limiting embodiment, path 80 corresponds to the longitudinal axis of symmetry of the expanded member 20. Since member 20 is positioned "behind" and in relatively close proximity to member 34 and since member 34 is operatively positioned and/or resides along this expansion path 80, member 34 is engaged by the selectively expanded member 20 and is caused to partially "break away" and/or to become dislodged from the member 30 (e.g., member 40 becomes dislodged from groove 37), thereby allowing the selectively expanded member 20 to desirably enter the passenger compartment 28 and protecting the occupants from harm. In other non-limiting embodiments, the expanded member 20 also selectively "expands through" or dislodges trim member 33 and/or headliner 32. It should be appreciated that other "connection schemes", methods, and/or devices may be used to operatively and removably couple members 30, 34 and that this invention is not limited to the use of member 40 and/or grooves 37, 42.

Mounting and storing efficiency may be greatly enhanced by the use of this "break away" concept, technique, and/or methodology included and described within this application. Hence, virtually any vehicle member and/or assembly may be modified and/or adapted to include a "breakaway" portion which is operatively disposed within close proximity to and within the path of travel of the selectively expandable restraint assembly. This "breakaway" concept therefore allows for relatively "tight" packaging without adversely effecting the operation of these restraint assemblies. It should also be noted that assembly 10 may be selectively placed within virtually any type of passenger compartment 28 and that this invention is not limited to the type and/or configuration of the passenger compartment 28 which is shown, by way of example and without limitation, in FIG. 4. It should further be realized that members 30, 34 may be easily "reconnected" after the expansion by coupling the members 30, 34 in the previously described manner and by retrieving and placing ring 40 within groove 37.

It is to be understood that the invention is not limited to the exact construction and method which has been illustrated and described above but that various changes and modifications may be made without departing from the spirit and the scope of the invention.

What is claimed is:

1. A member for use within a vehicle of the type having a selectively inflatable restraint apparatus which is movable from a first stored position to a second expanded position, said member comprising first and second end portions and a corrugated central portion which is removably connected to said first and second end portions and which becomes disconnected from at least one of said first and second end portions as said inflatable restraint apparatus moves to said second expanded position, thereby allowing said inflatable restraint apparatus to expand within said vehicle.

2. The member of claim 1 wherein said member is substantially hollow.

3. The member of claim 2 wherein said central portion is made from rubber.

4. The member of claim 1 wherein said first and second end portions are formed from a first material and wherein said central portion is formed from a second material.

5. The member of claim 1 wherein said central portion includes a substantially "U"-shaped groove which frictionally receives said first end portion and which allows said central portion to be removably connected to said first end portion.

6. The member of claim 1 wherein the member is adapted to be attached to said vehicle beneath a trim member thereof.

7. The member of claim 3 wherein said member is adapted to be mounted within a headliner and of said vehicle.

8. In combination, an assembly and a vehicle of the type having a vent member which transports air within said vehicle, said assembly comprising:

a first portion which selectively expands within said vehicle; and a second portion which overlays said first portion, which is removably attached to said vent member, which cooperates with said vent member to transport said air within said vehicle, and which becomes dislodged from said vent member when said first portion expands within said vehicle.

9. The assembly of claim 8 wherein said first portion comprises an air bag.

10. The assembly of claim 8 wherein said first portion comprises a selectively expandable curtain.

11. The assembly of claim 8 wherein said second portion is hollow.

12. The assembly of claim 8 wherein said second portion includes a plurality of pleats.

13. The assembly of claim 8 wherein said second portion is corrugated.

14. A method for mounting a selectively expandable restraint assembly within a vehicle of the type having a vent member which selectively transports air within said vehicle, said selectively expandable restraint assembly expanding along a certain path of travel, said method comprising the steps of:

removing a portion of the vent member;

replacing the removed portion of the vent member with a second member; and mounting the selectively expandable restraint assembly in close proximity to said second member, effective to place said second member within said path of travel.

15. A member for use within a vehicle of the type having a selectively inflatable restraint apparatus which is movable from a stored position to an expanded position, said member comprising first and second end portions, a central portion which is removably connected to said first and second end portions, at least one ring member for coupling said central portion to one of said first and second end portions, wherein said central portion becomes disconnected from at least one of said first and second end portions as said inflatable restraint apparatus moves to said expanded position, thereby allowing said inflatable restraint apparatus to expand within said vehicle.

* * * * *